United States Patent [19]
Ishizuka et al.

[11] Patent Number: 5,067,813
[45] Date of Patent: Nov. 26, 1991

[54] OPTICAL APPARATUS FOR MEASURING DISPLACEMENT OF AN OBJECT

[75] Inventors: Kou Ishizuka, Urawa; Tetsuharu Nishimura, Kawasaki; Masaaki Tsukiji; Satoshi Ishii, both of Tokyo, Japan

[73] Assignee: Canon Kabushiki Kaisha, Tokyo, Japan

[21] Appl. No.: 334,197

[22] Filed: Apr. 6, 1989

[30] Foreign Application Priority Data

Apr. 6, 1988 [JP] Japan ................................ 63-84584
Apr. 6, 1988 [JP] Japan ................................ 63-84585

[51] Int. Cl.⁵ .............................................. G01B 9/02
[52] U.S. Cl. .................................. 356/351; 250/225; 356/356
[58] Field of Search ................ 356/356, 351; 250/225

[56] References Cited

U.S. PATENT DOCUMENTS 4,676,645 6/1987 Taniguchi et al. ................... 356/356
4,829,342 5/1989 Nishimura ........................... 356/356

Primary Examiner—Davis L. Willis
Assistant Examiner—Matthew W. Koren
Attorney, Agent, or Firm—Fitzpatrick, Cella, Harper & Scinto

[57] ABSTRACT

Disclosed is an optical apparatus which can be used for measuring displacement of an object. The apparatus includes an optical system for forming a linearly polarized beam whose polarization direction changes, a reflecting surface for reflecting the beam and for directing the beam in a predetermined direction, a photoelectric converter for photoelectrically converting a reflected beam directed in the predetermined direction, a polarizing device, arranged in an optical path of the reflected beam, for directing only a P-polarized beam or an S-polarized beam of the reflected beam toward the photoelectric converter.

18 Claims, 4 Drawing Sheets

OPTICAL APPARATUS FOR MEASURING DISPLACEMENT OF AN OBJECT

BACKGROUND OF THE INVENTION

1. Field of the Invention

The present invention relates to an optical apparatus and, more particularly, to an optical apparatus wherein circularly polarized beams, having opposite directions and having variations in phase caused by an object to be measured, are superposed on each other, so as to convert variations in physical characteristics such as position, rotation angle, and density of an object to be measured, into a linearly polarized beam, and a rotation amount and rotation direction of the linearly polarized beam are detected so as to detect the variation amounts and directions of the physical characteristics of the object.

2. Related Background Art

Several conventional apparatuses have been provided, each wherein two diffracted beams output from an object to be measured, or one diffracted beam and a reference beam, are superposed on each other, upon incidence of a laser beam on a diffraction grating formed on the object, to form a linearly polarized beam rotating in accordance with a phase difference between the above pair of beams, and a rotation amount and rotation direction of the linearly polarized beams are detected, to thereby detect variations in physical characteristics such as position and a rotation angle of the object. Of these apparatuses, apparatuses for converting a displacement of an object into a change in brightness of interference fringes and detecting a direction of movement of the object are disclosed in U.S. Pat. Application Ser. Nos. 880,207, 196,850 002,229, 002,228, 256,432, for example, of the same assignee.

In some of the apparatuses disclosed in the above-noted U.S. patent applications, two beams output from a diffraction grating formed on the object and to be superposed on each other are converted into linearly polarized beams whose polarization planes are perpendicular to each other. The two beams pass through a phase plate ($\lambda/4$ plate) having anisotropic properties in directions inclined by 45° with respect to the polarizing directions of the two beams, so that these two beams are converted into circularly polarized beams which are rotated in opposite directions. These circularly polarized beams are superposed on each other to obtain a single linear polarized beam. At this time, a polarization direction of the linearly polarized beam is rotated in accordance with a difference between phases of the above two beams which are superposed first. When this linearly polarized beam passes through a polarizing plate having a polarization axis in an appropriate direction and is received by a photoelectric transducer element, a signal having a sinusoidally changing intensity can be output from the photoelectric transducer element.

The phase of an output signal from the photoelectric transducer element can be arbitrarily changed by appropriately selecting the direction of the polarization axis of the polarizing plate.

For example, when the superposed beam is split into beams, and these split beams are detected through polarizing plates having polarization axes 45° out of phase, the phases of the resultant signals are shifted from each other by 90°. A beam splitter called a half mirror is conventionally available to split the beam into a reflected beam and a transmitted beam. A metal or dielectric material is deposited on a beam splitting surface of the beam splitter on the order of a wavelength. The amounts of reflected and transmitting beams can be adjusted by the type, thickness, and structure of the deposited material. For example, when an amount of a transmitted beam, an amount of a reflected beam, and polarized components suffixed to the transmitted and reflected beams are defined as T, R, P, and S, respectively, the beam splitter satisfies the following equations:

$$T_P = \alpha R_P$$

$$T_S = \alpha R_S$$

If $\alpha = 1$, then a ratio of the amount of transmitted beam to the amount of reflected beam is always 1.

It is difficult to cancel a phase difference between P- and S-polarized components of light reflected by the beam splitting surface with respect to the beam splitting surface. The phase difference often varies depending on the wavelength of the incident light and on the incident angle of the light incident on the beam splitting surface.

In a nonpolarization beam splitter having a 1:1 ratio of the amounts of transmitted and reflected beams at 780 nm, the spectral characteristics of the amounts of the transmitted and reflected beams are shown in FIG. 1. The spectral characteristics of the phases of the transmitted and reflected beams are shown in FIG. 2.

When a phase difference occurs between the P- and S-polarized components and when a beam which is incident on the beam splitter is a linearly polarized beam in a direction inclined at 45° from the beam splitting surface, this beam is polarized into an elliptically polarized beam. As a result, when one of the beams (from the nonpolarization beam splitter) which has a larger phase difference between the P- and S-polarized components is observed through a polarizing plate, a loss in the light amount occurs even if the direction of the linearly polarized beam incident on the beam splitter is aligned with the polarization direction of the polarizing plate. On the other hand, even when the direction of the linearly polarized beam is perpendicular to the polarization direction of the polarizing plate, a beam can escape from the polarizing plate and therefore, a contrast level of an output signal, which is changed upon rotation of the polarization plane of the linearly polarized line incident on the beam splitter, is lowered. In the worst case, when the phase difference between the P- and S-polarized components is 90°, a beam reflected by the beam splitter becomes a circularly polarized beam. Therefore, the level of the signal photoelectrically converted through the polarizing plate no longer changes.

The phase difference between the P- and S-polarized components is sensitively changed depending on a variation in wavelength of a light source and on an error of an incident angle. For example, if a semiconductor laser is used as a light source, an oscillation wavelength varies on an order of about 10 nm due to variations in the center frequency of the individual lasers and due to changes in temperature. Therefore, it is very difficult to increase a contrast level of the output signal.

As shown in FIG. 2, the above phenomenon typically occurs in a beam reflected by the beam splitting surface of the nonpolarization beam splitter.

When an element such as a total reflection surface which causes a phase difference between P- and S-polarized components is inserted in front of or behind the beam splitter, i.e., in a path for transmitting the rotating linearly polarized beam, the linear polarized beam incident on the reflecting surface at 45° is polarized into an elliptically polarized beam, thus creating the above-noted problem.

In an optical encoder required to detect a displacement direction, two output signals serve as A-and B-phase signals. In this case, the amplitude component of only the A-phase signal obtained by using the reflected beam of the two beams obtained from the nonpolarization beam splitter is changed in response to a variation in ambient temperature, thereby degrading measurement precision.

SUMMARY OF THE INVENTION

It is an object of the present invention to provide an optical apparatus which can reduce or solve the problems created by the above-noted beam splitter and which is used to measure a displacement of an object to be measured, or the like.

In order to achieve the above object according to one aspect of the present invention, there is provided an optical apparatus comprising a beam splitter located in an optical path of a linearly polarized beam whose polarization direction is changed in response to a displacement, or the like, of an object to be measured, first photoelectric converting means for photoelectrically converting a beam transmitted through the beam splitter, a first polarizing element, arranged in an optical path of the transmitted beam, for directing only a beam component polarized in a first direction toward the first photoelectric converting means, second photoelectric converting means for photoelectrically converting a beam reflected by the beam splitter, and a second polarizing element, arranged in an optical path of the reflected beam, for directing only a beam component polarized in a second direction different from the first direction toward the second photoelectric converting means, wherein a P- or S-polarized component of the reflected beam is directed toward the first photoelectric converting means by the second polarizing element.

In order to achieve the above object according to another aspect of the present invention, there is provided an optical apparatus comprising a beam splitter arranged in an optical path of a linearly polarized beam whose polarization direction is changed in response to a displacement, or the like, of an object to be measured, first photoelectric converting means for photoelectrically converting a beam transmitted through the beam splitter, a first polarizing element, arranged in an optical path of the transmitted light, for directing only a beam component polarized in a first direction toward the first photoelectric converting means, second photoelectric converting means for photoelectrically converting a beam reflected by the beam splitter, a second polarizing element for directing a beam component polarized in a second direction different from the first direction toward the second photoelectric converting means, and correcting means for canceling a phase difference between P- and S-polarized components of the beam reflected by the beam splitter.

The above and other aspects, and detailed apparatus structures will be apparent in the preferred embodiments described in conjunction with the accompanying drawings.

DETAILED DESCRIPTION OF THE PREFERRED EMBODIMENTS

Figure 1:
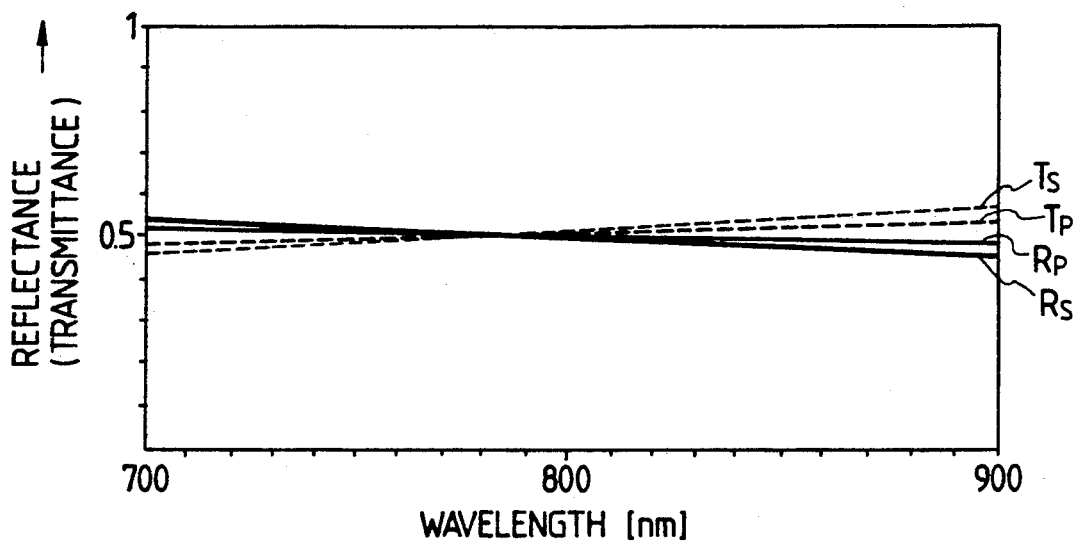
FIG. 1 is a graph showing spectral characteristics of beams transmitted through and reflected by a nonpolarization beam splitter.
Figure 2:
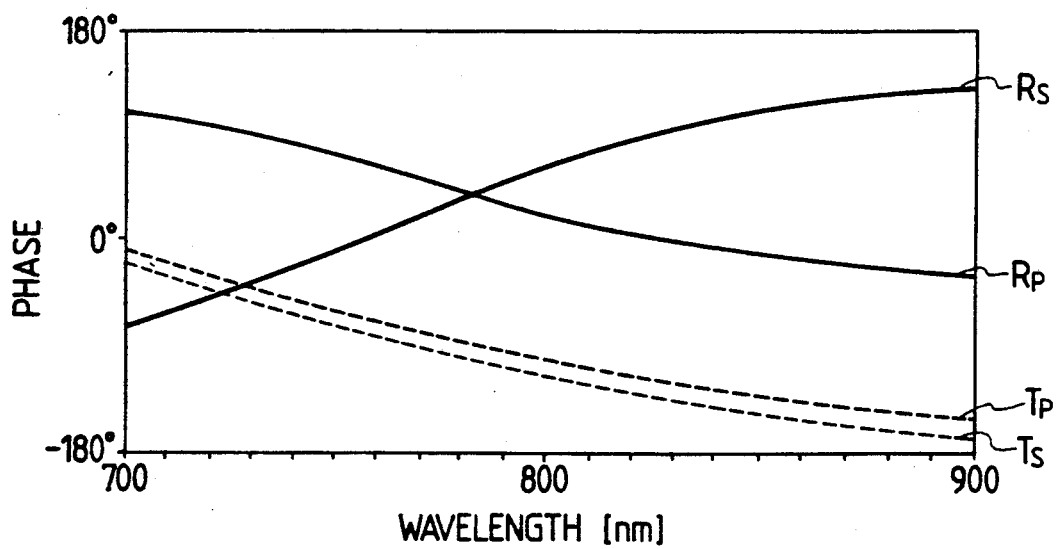
FIG. 2 is a graph showing spectral characteristics of phases of the beams transmitted through and reflected by the nonpolarization beam splitter.
Figure 3:
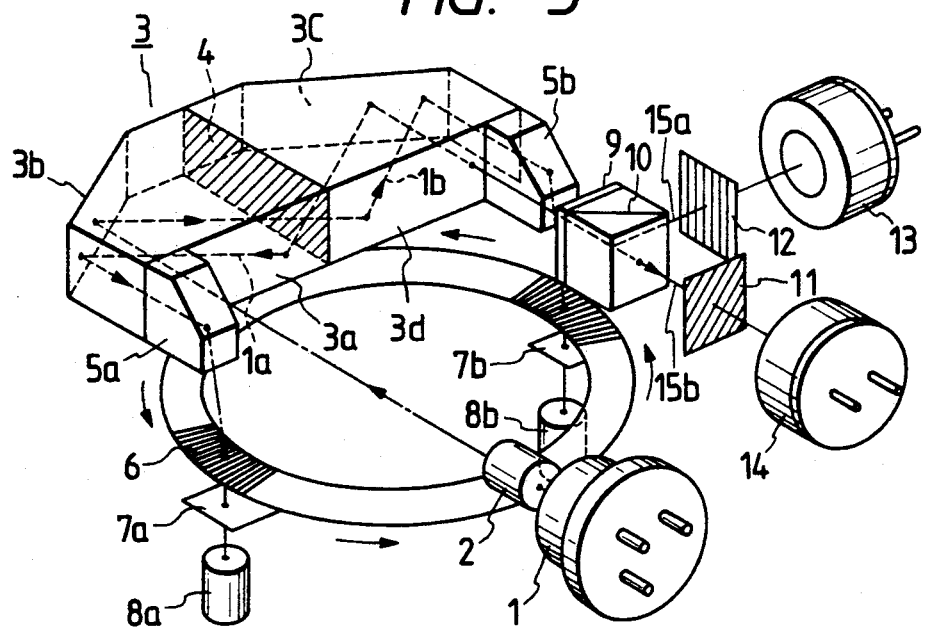
FIG. 3 is a schematic perspective view showing an optical apparatus according to a first embodiment of the present invention.

FIG. 3 is a schematic perspective view of an optical apparatus applied to a 2-phase output rotary encoder according to a first embodiment of the present invention.

The rotary encoder includes a light source 1 which comprises a semiconductor laser, a collimator lens 2 for collimating a laser beam from the light source 1 into a parallel beam, a prism 3 including a beam splitting surface 4 therein, folded prisms 5a and 5b mounted on parts of the prism 3, and a disc (rotation scale) 6. The disc 6 has a radial diffraction grating and is mounted on an object to be measured (not shown).

The rotary encoder also includes λ/4 plates 7a and 7b, reflecting members 8a and 8b comprising, e.g., reflecting mirrors and cat's-eye optical systems, a λ/4 plate 9, a nonpolarization beam splitter 10, and polarizing elements 11 and 12. The polarizing element 11 comprises a polarizing plate having a 45° polarization direction, and the polarizing element 12 comprises a polarizing plate having a 0° polarization direction. The rotary encoder further includes an A-phase detecting element (photoelectric transducer element) 13 and a B-phase detecting element (photoelectric transducer element). The phases of A-and B-phase signals are shifted from each other by 90°.

In this embodiment, a beam from the light source 1 is collimated by the collimator lens 2 into a parallel beam, and the parallel beam is incident on an incident surface 3a of the prism 3 and is reflected by a reflecting surface 3b. The reflected beam is then guided to the laser beam splitting surface 4 and is split into horizontal and vertical linear polarized components, i.e., P- and S-polarized components.

Of these components, a beam 1a of the S-polarized component whose polarization direction is horizontal with respect to the beam splitting surface 4 is reflected by the reflecting surface 3b and a reflecting surface of the folded prism 5a. The reflected beam is incident on the disc 6.

Of all the diffracted beams from the radial diffraction grating of the disc 6, a beam of the first order is converted into a circularly polarized beam through the λ/4 plate 7a and is further converted into a circularly polarized beam of reverse rotation by the reflecting member 8a. The circularly polarized beam passes through the λ/4 plate 7a, thereby obtaining a linearly polarized beam (P-polarized beam) whose polarization direction is rotated through 90° from the beam of the forward path.

The beam is again guided to the prism 3 through the disc 6 and the folded prism 5a and is reflected by the reflecting surface 3b. The reflected beam passes through the beam splitting surface 4. This beam is reflected by a reflecting surface 3c and is output from an exit surface 3d as a P-polarized beam.

Meanwhile, a P-polarized transmitted beam 1b having a vertical polarization direction with respect to the beam splitting surface 4 is reflected by the reflecting surface 3C and then by the reflecting surface of the folded prism 5b. The reflected beam is incident on the disc 6. A diffracted beam of −1st order of the beams diffracted by the disc 6 is converted into a circularly polarized beam through the λ/4 plate 7b and is further converted into a circularly polarized beam of reverse rotation by the reflecting member 8b. This circularly polarized beam is reflected toward the same path as the forward path and is transmitted through the λ/4 plate 7b, thereby obtaining a linearly polarized beam (S-polarized beam) rotated through 90° with respect to the beam of the forward path.

The beam is again guided through the disc 6 and the folded prism 5b and is reflected by the reflecting surface 3C and the beam splitting surface 4 in the order named. The beam is further reflected by the reflecting surface 3C again and is output from the exit surface 3d as an S-polarized beam.

In this case, the two beams output from the exit surface 3d of the prism 3 are superposed on each other, and the superposed beams pass through the λ/4 plate 9, interfere with each other, and are converted into a linearly polarized beam. In this case, the direction of the linearly polarized beam is rotated upon rotation of the disc 6. More specifically, the linearly polarized beam is rotated twice per one-pitch displacement (rotation) of the radial diffraction grating.

This linearly polarized beam is divided into two beams, i.e., a reflected beam 15a and a transmitted beam 15b, by the nonpolarization beam splitter 10. Of these beams, the reflected beam 15a is photoelectrically converted by the A-phase detecting element 13 through the polarizing plate 12 having a polarization direction aligned with that of the P- or S-polarized component of the reflected beam 15a when viewed with reference to the beam splitting surface 10. Meanwhile, the transmitted beam 15b is photoelectrically converted by the B-phase detecting element 14 through the polarizing plate 11 arranged to transmit the same amounts of the P- and S-polarized components, i.e., having a polarization direction phase-shifted from the P- or S-polarized components of the transmitted beam 15b by 45°.

Figure 4:
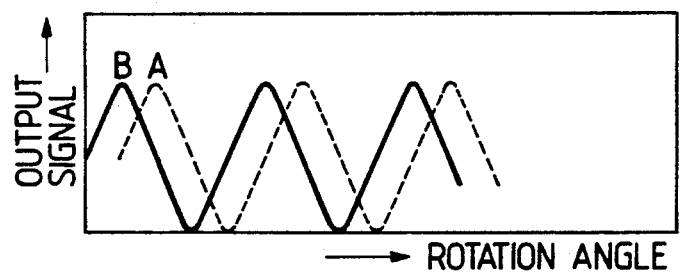
FIGS. 4 and 5 are views for explaining output signals from the optical apparatus shown in FIG. 3.

Output signals from the detecting elements 13 and 14 are given as shown in FIG. 4 upon rotation of the disc 6. Referring to FIG. 4, a signal A is output from the A-phase detecting element 13, and a signal B is output from the B-phase detecting element 14.

In this embodiment, the two phase signals A and B output from the detecting elements 13 and 14 are utilized to detect a rotation angle and a rotation direction of the object mounted on the disc 6.

Figure 5:
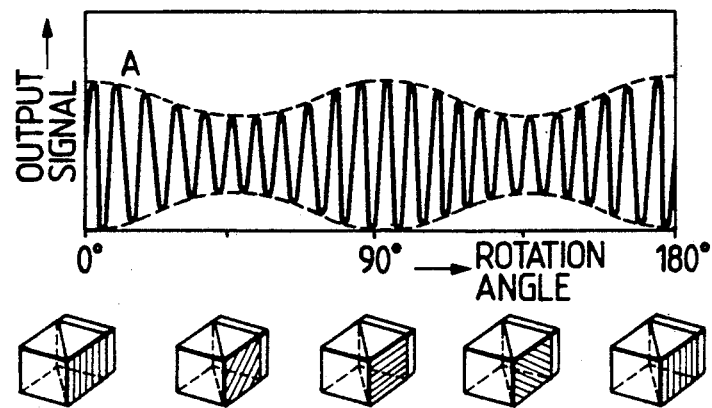

FIG. 5 is a view for explaining a sinusoidal signal obtained upon rotation of the disc 6 when a mounting direction of the polarizing plate 12 in FIG. 3 is changed.

As shown in FIG. 5, when the reflected beam from the nonpolarization beam splitter 10 is detected, an amplitude of the sinusoidal signal, detected in accordance with an angular position of the polarizing plate 12, is changed. The amplitude of the sinusoidal signal is minimum when the polarization directions of the polarizing plate 12 are 45°, 135°, 225°, and 315°. The amplitude of the sinusoidal signal is maximum when the polarization directions are 0°, 90°, 180°, 270°, and 360°. In this embodiment, the polarizing plate 12 is directed in the direction where the amplitude of the sinusoidal signal is maximum, thereby giving a high contrast level to the output from the detecting element 13. When the polarization direction is set to be 0° or 180°, only the S-polarized component of the reflected beam 15a can be guided to the detecting element 13. However, when the polarization direction is set to be 90° or 270°, only the P-polarized component of the reflected beam 15a can be guided to the detecting element 13.

Figure 6:
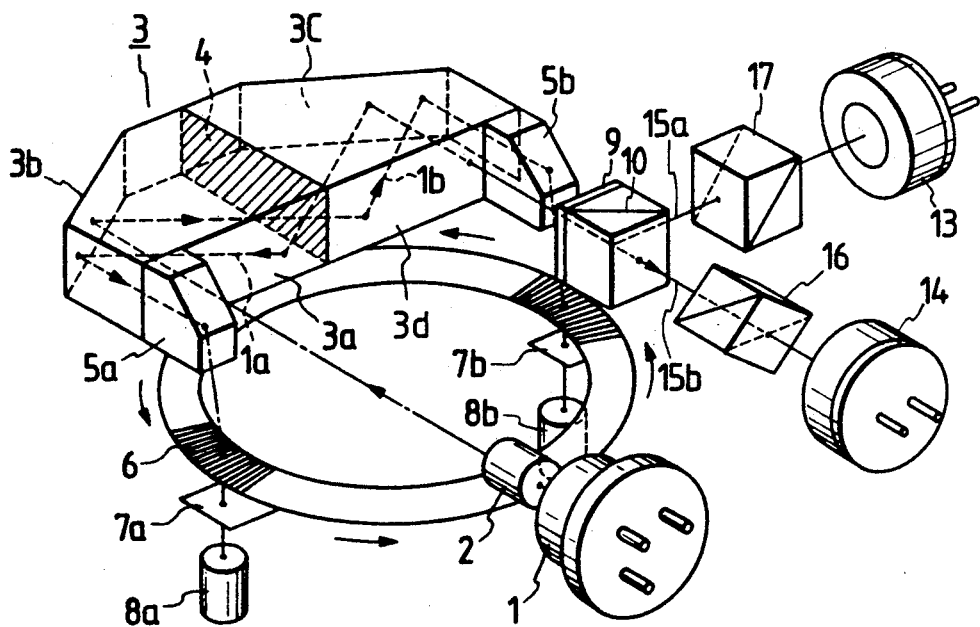
FIG. 6 is a schematic perspective view of an optical apparatus according to a second embodiment of the present invention.

FIG. 6 is a schematic perspective view of an optical system including polarizing prisms 16 and 17, in place of the polarizing plates 11 and 12 of FIG. 3, according to a second embodiment of the present invention. Referring to FIG. 6, the polarizing prism 16 is inclined at 45° on the transmitted beam side of the nonpolarization beam splitter 10 within the incident surface.

Figure 7:
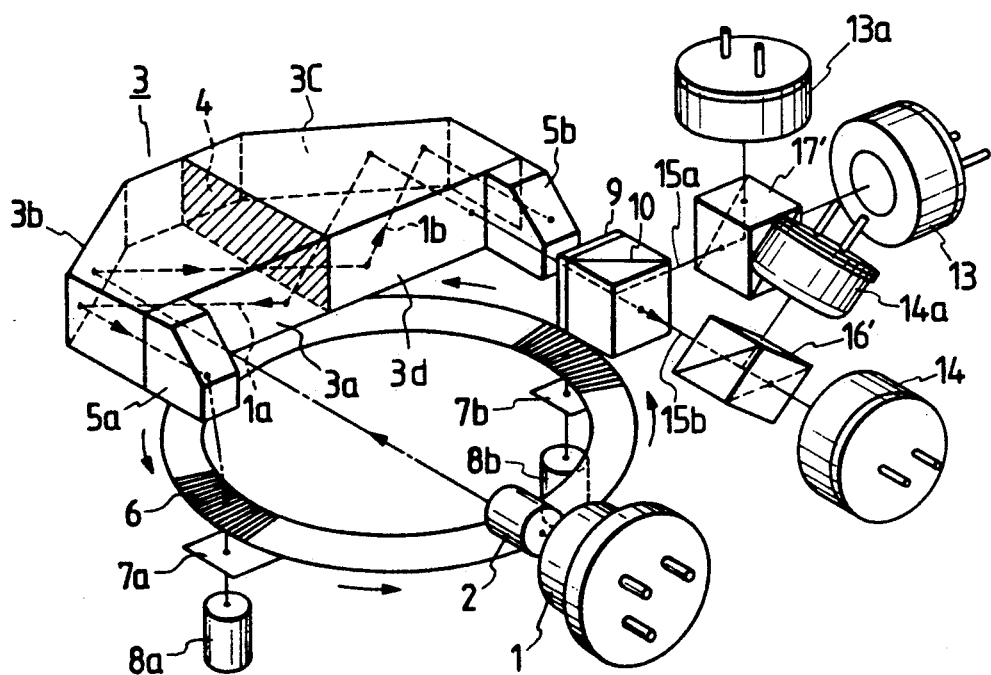
FIG. 7 is a schematic perspective view of an optical apparatus according to a third embodiment of the present invention.

FIG. 7 is a schematic perspective view of an optical system according to a third embodiment of the present invention wherein, in the rotary encoder of FIG. 3, the reflected and transmitted beams from the nonpolarization beam splitter 10 are split into halves by polarizing beam splitters 16′ and 17′ serving as the beam splitting means, thereby obtaining four-phase outputs.

In this embodiment, since the four-phase outputs can be obtained, the displacement of the object to be measured can be more accurately detected as compared with the two-phase signals.

In the optical apparatus of each embodiment described above, when a variation of a physical amount of the object to be measured is converted into rotation of the polarization direction of the linearly polarized beam and is thus detected, of a plurality of beams split by the beam splitter, the beam reflected by the beam splitting surface is detected through the polarizing element whose polarization direction is not affected by a phase shift between the P- and S-polarized components. Therefore, a high-precision optical apparatus can be obtained wherein the contrast level of the interference signals does not vary even if the oscillation wavelength of the light source 1 varies.

The present invention is not limited to rotary encoders, but is also applicable to linear encoders. The present invention is further applicable to an optical measuring apparatus utilizing changes in length of the optical paths and changes in phase of coherent linearly polarized beams whose polarization directions are perpendicular to each other.

Figure 8:
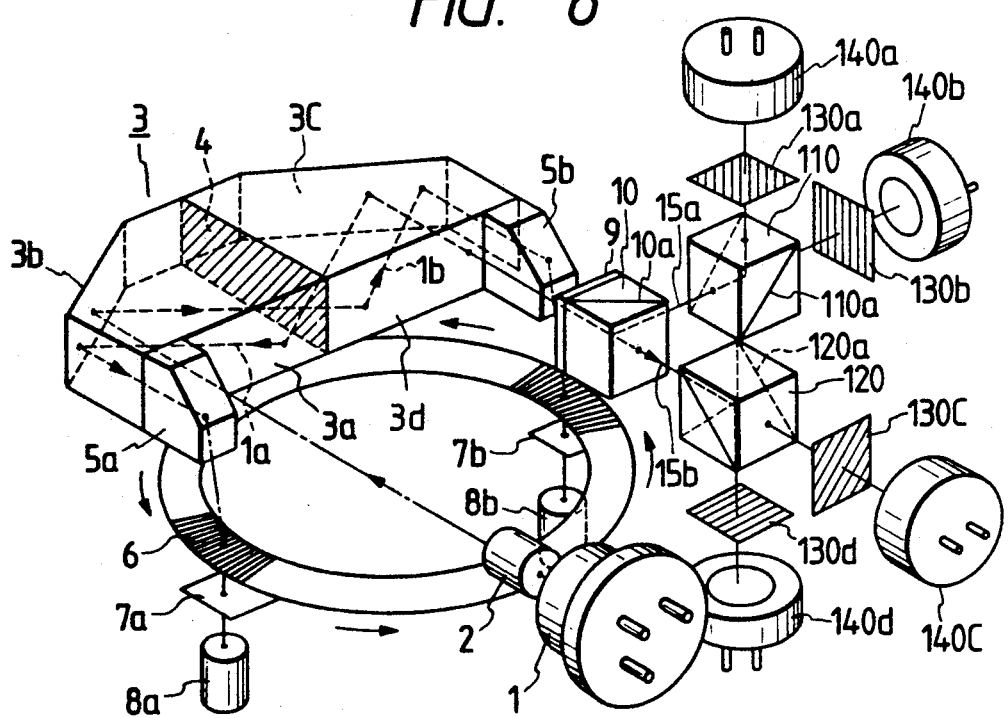
FIG. 8 is a schematic perspective view of an optical apparatus according to a fourth embodiment of the present invention.

FIG. 8 is a schematic perspective view of an optical apparatus exemplified as a four-phase output rotary encoder according to a fourth embodiment of the present invention. The third embodiment is substantially the same as the second embodiment.

Referring to FIG. 8, the rotary encoder includes a semiconductor laser 1, a collimator lens 2 for collimating a laser beam from the semiconductor laser 1 into a parallel beam, a prism 3 having a beam splitting surface 4 therein, folded prisms 5a and 5b mounted on parts of the prism 3, and a disc (rotation scale) 6 having a radial diffraction grating. The disc 6 is attached to an object to be measured (not shown). The rotary encoder also includes λ/4 plates 7a and 7b, reflecting members 8a and 8b comprising reflecting mirrors and cat's-eye optical systems, a λ/4 plate 9, a first nonpolarization beam splitter 10, second and third nonpolarization beam splitters 110 and 120, polarizing plates 130a to 130d, and four-phase signal detecting elements (photoelectric transducer elements) 140a to 140d, comprising photodiodes.

In this embodiment, a beam from the semiconductor laser 1 is collimated into a parallel beam by the collimator lens 2, and the parallel beam is incident on an incident surface 3a of the prism 3 and is reflected by a reflecting surface 3b. The reflected beam is guided to the beam splitting surface 4 and is split into horizontal and vertical linear polarized components, i.e., P- and S-polarized components of the reflected beam 1a incident on the beam splitting surface 4.

Of these beams, only the reflected beam of the S-polarized component horizontal with respect to the beam splitting surface 4 is reflected by the reflecting surface 3b and the reflecting surface of the folded prism 5a. The reflected beam is then incident on the surface of the disc 6.

A beam of the first order of the diffracted beams from the diffraction grating of the disc 6 is polarized into a circular polarized beam through the λ/4 plate 7a. The circular polarized beam is polarized again into a circular polarized beam of reverse rotation by the reflecting member 8a. This circular polarized beam is reflected in the same path as the forward path and is transmitted through the λ/4 plate 7a, thereby obtaining a linearly polarized beam (P-polarized beam) whose polarization direction is rotated through 90° with respect to the beam of the forward path.

The beam is then guided to the prism 3 through the disc 6 and the folded prism 5a and is reflected by the reflecting surface 3b. The reflected beam passes through the beam splitting surface 4 and is reflected by the reflecting surface 3C. The reflected beam is output from the exit surface 3d as a P-polarized beam.

Meanwhile, the transmitted beam 1b of the P-polarized component of the linearly polarized beam having the polarization direction perpendicular to and passing through the beam splitting surface 4 is reflected by the reflecting surface 3C and then by the reflecting surface of the folded prism 5b. The reflected beam is incident on the disc 6. A beam of −1st order of the diffracted beams from the diffraction grating of the disc 6 is polarized into a circularly polarized beam through the λ/4 plate 7b and is reflected as a circularly polarized beam of reverse rotation by the reflecting member 8b. Therefore, the circularly polarized beam of reverse rotation returns along the same optical path of the beam of the forward path and passes through the λ/4 plate 7b. Therefore, the polarization direction is rotated through 90° from the beam of the forward path, thereby obtaining a linearly polarized beam (S-polarized beam).

This beam is guided to the prism 3 through the disc 6 and the folded prism 5b and is reflected by the reflecting surface 3C and the beam splitting surface 4 in the order named. The beam is then reflected by the reflecting surface 3C again and is output from the exit surface as an S-polarized beam.

In this case, the two beams output from the exit surface 3d of the prism 3 are superposed, pass through the λ/4 plate 9, and interfere with each other. Therefore, the superposed beam is polarized into a linearly polarized beam. The direction of the linearly polarized beam is rotated upon rotation of the disc 6. More specifically, the linearly polarized beam is rotated twice per one-pitch displacement of the radial diffraction grating.

The linearly polarized beam is split into a reflected beam 15a and a transmitted beam 15b by a first beam splitting surface 10a of the first nonpolarization beam splitter 10. The reflected beam 15a has a phase difference δ between its P- and S-polarized components when viewed with reference to the beam splitting surface 10a. A second beam splitting surface 110a is located such that a relationship beam splitter 110 is located such that a relationship between the P- and S-polarized components with respect to the first beam splitting surface 10a of the first nonpolarization beam splitter 10 is reversed. A beam serving as the P-polarized component on the first beam splitting surface 10a serves as the S-polarized component on the second beam splitting surface 110.

On the other hand, the beam serving as the S-polarized component on the first beam splitting surface 10a serves as the P-polarized component on the second beam splitting surface 110. Therefore, phase differences between the P- and S-polarized components are canceled with respect to the beams reflected by the first and second beam splitting surfaces 10a and 110a. That is, the phase differences become zero. The beam is photoelectrically converted by the detecting element 14a through the polarizing plate 130a whose polarization axis is directed in an arbitrary direction. An output signal having a high contrast level can be obtained. The output signal is changed in response to a change in density of interference fringes (single color) formed by the two interfering beams.

However, the phase difference between components of the beam passing through the second beam splitting surface 110a is not canceled. As described with reference to the first to third embodiments, this beam is photoelectrically converted by the detecting element 140b through the polarizing plate 130b whose polarization axis is directed in a direction along which only the P- or S-polarized component passes.

The beam 15b passing through the first splitting surface 10a of the first nonpolarization beam splitter 10 is split into two beams by a third beam splitting surface 120a of the third nonpolarization beam splitter 120.

Although the beam 15b passing through the first beam splitting surface 10a has a small phase difference $\delta_0$, the beam passing through the third beam splitting surface 120a has a reversed relationship between the P- and S-polarized components with respect to the reflecting surface, thereby canceling the phase difference $\delta_0$. For this reason, this beam is photoelectrically converted by the detecting element 140C through the polarizing plate 130C whose polarization axis is directed in an arbitrary direction, thereby always obtaining an output signal having a high contrast level.

Since the phase difference between the S- and P-polarized components of the beam reflected by the third beam splitting surface 120a is not canceled, the beam is photoelectrically converted by the detecting element 140d through the polarizing plate 130d whose polarization axis is directed in a direction along which only the P- or S-polarized component passes as in the first to third embodiments.

It should be noted that the first to third beam splitting surfaces are formed by films having identical polarization characteristics.

In this embodiment, the polarizing plate may be replaced with another optical member such as a polarizing prism or a polarization beam splitter.

In this embodiment, by using the four-phase signals output form the detecting elements 140a to 140d, the rotation angle and displacement direction of the object mounted on the disc 6 are detected.

Figure 9:
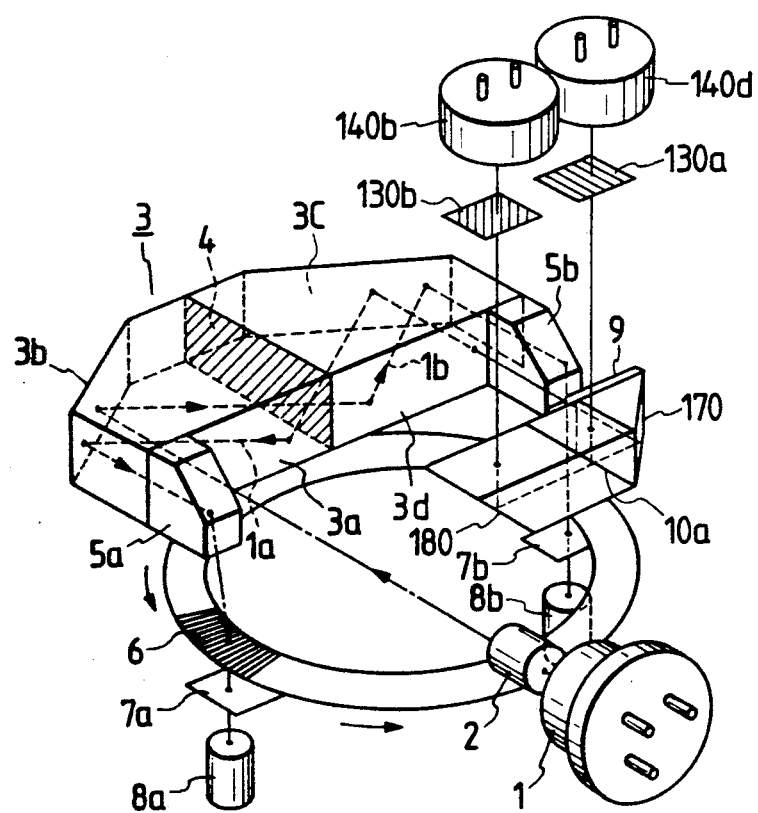
FIG. 9 is a schematic perspective view of an optical apparatus according to a fifth embodiment of the present invention.

FIG. 9 is a schematic perspective view showing an optical apparatus exemplified as a two-phase rotary encoder according to a fifth embodiment of the present invention.

The fifth embodiment is substantially the same as the fourth embodiment with respect the following point. A beam from a semiconductor laser 1 is incident on a prism 3 and is output from an exit surface 3d, and the beam is then transmitted through a λ/4 plate 9.

Referring to FIG. 9, a linearly polarized beam passing through the λ/4 plate 9 is reflected by a reflecting surface 170 such that a phase difference $\delta_1$ occurs between its P- and S-polarized components. The beam is split by a beam splitting surface 10a of a nonpolarization beam splitter. A phase difference $\delta_2$ between the P- and S-polarized components is added to the beam reflected by the beam splitting surface 10a, but the phase differences between P- and S-polarized components cannot be canceled eve if their signs are different from each other. As described with reference to the first to third embodiments, the P- or S-polarized component of the beam is photoelectrically converted by an A-phase detecting element 13 through a polarizing plate 130a whose polarization axis is aligned with the polarization direction of the P- or S-polarized components. The beam passing through the beam splitting surface 10a is reflected by a reflecting surface 180 identical with the reflecting surface 170. In this case, the relationship between the P- and S-polarized components with respect to the reflecting surface 180 is reversed from that with respect to the reflecting surface 170, thereby causing a phase difference $-\delta_1$. A total phase difference between the P- and S-polarized components is almost zero, since the phase differences cancel each other. Even if any component of this beam is extracted by a polarizing element, a density signal having a high contrast level can be obtained. The beam is photoelectrically converted by a B-phase detecting element 140b through a polarizing plate 130b having a polarization direction inclined at 45° from the polarization directions of the P- and S-polarized components. With this arrangement, a phase difference between A- and B-phase sinusoidal signals is 90°.

In the optical apparatuses of the fourth and fifth embodiments of the present invention, when a variation in physical characteristics of the object to be measured is obtained by converting the variation into rotation of the polarization direction of the linearly polarized beam, the linearly polarized beam is detected through at least one reflecting surface for canceling a P-S polarized component phase difference caused by a predetermined reflecting surface in the optical system. For example, even if an oscillation wavelength of the light source varies, the contrast levels of the interference signals do not vary. Therefore, there is provided an optical apparatus capable of performing high-precision detection by well-balanced output signals. Furthermore, the present invention is not limited to rotary encoders, but is also applicable to linear encoders. The present invention is further applicable to an optical measuring apparatus utilizing changes in optical path and changes in phase of two coherent linearly polarized beams whose polarization directions are perpendicular to each other.

What is claimed is:

1. An optical apparatus comprising:
   an optical system for generating a linearly polarized beam having a polarization direction which changes;
   a nonpolarization reflecting surface for reflecting the linearly polarized beam and for directing the reflected beam in a predetermined direction;
   photoelectric converting means for photoelectrically converting a beam reflected and directed in the predetermined direction by said nonpolarization reflecting surface; and
   a polarizing element, arranged in an optical path of the reflected beam, for polarizing a predetermined component of the reflected beam and for directing only one of a P-polarized beam and an S-polarized beam of the reflected beam toward said photoelectric converting means.

2. An apparatus according to claim 1, wherein said nonpolarization surface comprises beam splitting surface of a beam splitter.

3. An optical apparatus comprising:
   an optical system for generating a linearly polarized beam having a polarization direction which changes;
   a nonpolarization reflecting surface for reflecting the linearly polarized beam and for directing the reflected beam in a predetermined direction;
   photoelectric converting means for photoelectrically converting a beam reflected and directed in the predetermined direction by said nonpolarization reflecting surface;
   a polarizing element, arranged in an optical path of the reflected beam, for directing a predetermined polarized component of the reflected beam toward said photoelectric converting means; and
   correcting means, arranged in the optical path of the reflected beam between said nonpolarization reflecting surface and said polarizing element, for canceling a phase difference between P- and S-polarized components of the reflected beam caused by said reflecting surface.

4. An apparatus according to claim 3, wherein said correcting means comprises a reflecting surface for reflecting the reflected beam.

5. An apparatus according to claim 3, wherein said nonpolarization reflecting surface comprises a beam splitting surface of a beam splitter.

6. An apparatus according to claim 5, wherein said correcting means comprises a reflecting surface for reflecting the reflected beam.

7. An apparatus according to claim 6, wherein the reflecting surface of said correcting means comprises a reflecting surface of a beam splitter.

8. An apparatus according to claim 7, wherein the reflecting surface of said beam splitter comprises a beam splitting surface.

9. An optical apparatus comprising:
   an optical system for generating a linearly polarized beam having a polarization direction which changes in response to displacement of an object to be measured;

a nonpolarization beam splitter arranged in an optical path of the linearly polarized beam;

first photoelectric converting means for photoelectrically converting a beam transmitted through said beam splitter;

a first polarizing element, arranged in an optical path of the transmitted beam, for directing only a beam component polarized in a first direction to said first photoelectric converting means;

second photoelectric converting means for photoelectrically converting a beam reflected by said beam splitter; and a second polarizing element, arranged in an optical path of the reflected beam, for directing a beam component polarized in a second direction, different from the first direction, to said second photoelectric converting means, said second polarizing means being arranged in a polarization direction to direct only one of a P- and an S-polarized component of the reflected beam in a predetermined direction toward said second photoelectric converting means.

10. An apparatus according to claim 9, wherein the first and second directions are arranged to form an angle of 45°.

11. An apparatus according to claim 10, wherein said optical system comprises:

a movable diffraction grating;

means for superposing first and second diffracted beams received from said movable diffraction grating, the first and second diffracted beams being linearly polarized beams whose polarization directions are perpendicular to each other; and a λ/4 plate, arranged in an optical path of the superposed first and second diffracted beams, for generating a linearly polarized beam whose polarization direction changes in response to displacement of said diffraction grating.

12. An apparatus according to claim 11, further comprising detection means for detecting a displacement amount and a displacement direction of said diffraction grating on the basis of output signals generated by said first and second photoelectric converting means.

13. An optical apparatus comprising:

an optical system for generating a linearly polarized beam having a polarization direction which changes in response to displacement of an object to be measured;

a nonpolarization beam splitter arranged in an optical path of the linearly polarized beam;

first photoelectric converting means for photoelectrically converting a beam transmitted through said beam splitter;

a first polarizing element, arranged in an optical path of the transmitted beam, for directing only a beam component polarized in a first direction toward said first photoelectric converting means;

second photoelectric converting means for photoelectrically converting a beam reflected by said beam splitter;

a second polarizing element, arranged in an optical path of the reflected beam, for directing a beam component polarized in a second direction, different from the first direction, to said second photoelectric converting means; and correcting means, arranged in the optical path of the reflected beam between said beam splitter and said second polarizing element, for canceling a phase difference between P- and S-polarized components of the reflected beam caused by said beam splitter.

14. An apparatus according to claim 13, wherein the first and second direction are arranged to form an angle of 45°.

15. An apparatus according to claim 14, wherein said optical system comprises:

a movable diffraction grating, means for superposing first and second diffracted beams received from said movable diffraction grating, the first and second diffracted beams being linearly polarized beams whose polarization directions are perpendicular to each other; and a λ/4 plate, arranged in an optical path of the superposed first and second diffracted beams, for generating a linearly polarized beam whose polarization direction changes in response to displacement of said diffraction grating.

16. An apparatus according to claim 15, further comprising detection means for detecting a displacement amount and a displacement direction of said diffraction grating on the basis of output signals generated by said first and second photoelectric converting means.

17. An apparatus according to claim 13, wherein said correcting means comprises a beam splitter having a light splitting surface, said correcting means further comprising means for canceling the phase difference by reflecting the reflected beam by the light splitting surface of said beam splitter, and means for directing a beam reflected by the light splitting surface toward said second polarizing plate.

18. An apparatus according to claim 13, wherein said correcting means comprises a reflecting surface, said correcting means further comprising means for canceling the phase difference by reflecting the reflected beam by the correcting means reflecting surface, and means for directing a beam reflected by the reflecting surface toward said second polarizing element.

* * * * *

UNITED STATES PATENT AND TRADEMARK OFFICE
CERTIFICATE OF CORRECTION

PATENT NO. : 5,067,813           Page 1 of 3
DATED     : November 26, 1991
INVENTOR(S): Koh Ishizuka, et al.

It is certified that error appears in the above-identified patent and that said Letters Patent is hereby corrected as shown below:

ON THE TITLE PAGE

The Name of the First Named Inventor read "Kou Ishizuka" and should read --Koh Ishizuka--.

IN THE DISCLOSURE

COLUMN 3

Line 10, "A-and" should read --A- and--.

COLUMN 4

Line 53, "A-and" should read --A- and--.

COLUMN 5

Line 15, "surface 3c" should read --surface 3C--.

COLUMN 6

Line 44, "amount" should read --characteristics--.

COLUMN 7

Line 29, "3band" should read --3b and--; and
Line 68, "and the" should read --and by the--.

UNITED STATES PATENT AND TRADEMARK OFFICE
CERTIFICATE OF CORRECTION

PATENT NO. : 5,067,813

DATED : November 26, 1991

INVENTOR(S) : Koh Ishizuka, et al.

It is certified that error appears in the above-identified patent and that said Letters Patent is hereby corrected as shown below:

COLUMN 8

Line 18, "surface 110a is" should read --surface 110a of the second nonpolarization beam splitter 110 is--;
Line 19, "beam splitter 110 is located such that" should be deleted;
Line 20, "a relationship" should be deleted; and
Line 29, "surface 110." should read --surface 110a.--.

COLUMN 9

Line 11, "form" should read --from--;
Line 19, "respect" should read --respect to--; and
Line 32, "eve" should read --even--.

UNITED STATES PATENT AND TRADEMARK OFFICE
CERTIFICATE OF CORRECTION

PATENT NO. : 5,067,813

DATED : November 26, 1991

INVENTOR(S) : Koh Ishizuka, et al.

It is certified that error appears in the above-identified patent and that said Letters Patent is hereby corrected as shown below:

COLUMN 10

Line 28, "nonpolarization surface comprises" should read --nonpolarization reflecting surface comprises a--.

COLUMN 12

Line 22, "direction" should read --directions--.

Signed and Sealed this

Ninth Day of June, 1992

*Attest:*

DOUGLAS B. COMER

*Attesting Officer*   *Acting Commissioner of Patents and Trademarks*